United States Patent
Maldonado et al.

(10) Patent No.: US 11,670,936 B2
(45) Date of Patent: Jun. 6, 2023

(54) PROTECTION SYSTEM AND METHOD FOR ELECTRICAL POWER PLANT

(71) Applicant: Halliburton Energy Services, Inc., Houston, TX (US)

(72) Inventors: Jose L. Maldonado, Humble, TX (US); Glenn Howard Weightman, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 91 days.

(21) Appl. No.: 17/220,135

(22) Filed: Apr. 1, 2021

(65) Prior Publication Data

US 2022/0320852 A1 Oct. 6, 2022

(51) Int. Cl.
*H02H 7/06* (2006.01)
*H02J 3/38* (2006.01)
*H02J 3/00* (2006.01)

(52) U.S. Cl.
CPC ............ *H02H 7/062* (2013.01); *H02H 7/065* (2013.01); *H02J 3/001* (2020.01); *H02J 3/381* (2013.01)

(58) Field of Classification Search
CPC ... H04L 63/0428; H04L 63/08; H04L 67/306; H04L 67/10; H04L 67/12; H02H 1/0053; H02H 1/0061; H02H 7/06; H02H 7/26; H02H 7/262; H02H 7/266; H02H 7/30; H02H 7/065; H02H 7/38; H02H 3/04; H02H 3/162; H02H 3/00; H02H 3/006; H02H 3/044; H02H 3/40
See application file for complete search history.

(56) References Cited

U.S. PATENT DOCUMENTS

| | | | |
|---|---|---|---|
| 8,834,012 B2 | 9/2014 | Case et al. | |
| 9,164,148 B2 | 10/2015 | Klingel et al. | |
| 9,650,871 B2 | 5/2017 | Oehring et al. | |
| 10,578,653 B2 | 3/2020 | Chowdhury et al. | |
| 2006/0238172 A1* | 10/2006 | Maehara | H02H 7/06 322/33 |
| 2008/0157775 A1* | 7/2008 | Finney | G01R 31/3277 324/418 |
| 2015/0311696 A1* | 10/2015 | Zhu | H02J 3/0012 361/21 |
| 2018/0102650 A1* | 4/2018 | Bourgeau | H02J 3/38 |

* cited by examiner

*Primary Examiner* — Bryan R Perez (74) *Attorney, Agent, or Firm* — Conley Rose, P.C.; Rodney B. Carroll (57) ABSTRACT

An apparatus for managing a plurality of electric power generators is configured to receive measurements of a plurality of parameters related to performance of one or more of a plurality of generators and detect, based on the measurements, that values of at least two of the plurality of parameters measured for a first generator of the one or more generators do not match respective predetermined values of the at least two parameters for the first generator. In response to the detecting, the apparatus determines that the first generator is faulty and generates a signal to perform at least one of shutting down the first generator or disconnecting the first generator from at least one second generator of the plurality of generators, in response to determining that the first generator is faulty.

15 Claims, 5 Drawing Sheets

PROTECTION SYSTEM AND METHOD FOR ELECTRICAL POWER PLANT

TECHNICAL FIELD

The present disclosure relates generally to a system and method for protecting against a total power plant shutdown. More specifically, though not exclusively, the present disclosure relates to systems and methods for protecting against total power plant shutdown by proactively identifying and isolating a faulty electric power generator of a plurality of power generators.

BACKGROUND

Electrical power generation systems such as electric power plants often include multiple electric power generators connected in a single bus configuration where the multiple generators are connected in parallel to a single power bus. When multiple power generators are connected in a single bus configuration, electrical loads are connected to the common power bus and power requirements are shared between the multiple generators. A limitation of such a system is that failure of one of the multiple power generators can compromise the integrity of the entire power bus. For example, failure of a single power generator in the system may cause cascading failures across entire groups of power generators connected to the power bus and may lead to total power plant shutdown.

BRIEF DESCRIPTION OF DRAWINGS

Some specific exemplary aspects of the disclosure may be understood by referring, in part, to the following description and the accompanying drawings.

While aspects of this disclosure have been depicted and described and are defined by reference to exemplary aspects of the disclosure, such references do not imply a limitation on the disclosure, and no such limitation is to be inferred. The subject matter disclosed is capable of considerable modifications, alterations, and equivalents in form and function, as will occur to those skilled in the pertinent art and having the benefit of this disclosure. The depicted and described aspects of this disclosure are examples only, and not exhaustive of the scope of the disclosure.

DETAILED DESCRIPTION

Embodiments of the present disclosure discuss a system and methods implemented by the system for identifying a fault in an electric power generator of a plurality of generators, and shutting down the identified faulty generator and/or disconnecting the faulty generator from a common power bus, before the fault escalates and propagates to other healthy generators leading to a total power plant shut down. The terms electric power generator, power generator and generator are used interchangeably throughout this disclosure.

The system and methods implemented by the system as disclosed in the present disclosure provide technical solutions to the technical problems discussed above by promptly identifying faults in a generator and isolating the identified faulty generator before the fault can escalate to a total power plant shut down. The disclosed system and methods provide several practical applications and technical advantages. For example, a protective relay device monitors at least two parameters related to performance of a generator. Each of these parameters affect and/or indicate the performance of the generator and can help the relay device to determine whether the generator is operating normally or is faulty. The relay device checks whether values of the at least two parameters measured for the generator match with respective pre-determined values of the at least two parameters. The relay device determines that the generator is faulty in response to detecting that the values of the at least two parameters measured for the generator do not match the respective pre-determined values of the parameters for the generator. In response, the relay device generates a signal to shut down the faulty generator and/or disconnect the generator from the power bus. By quickly and accurately detecting a faulty generator, and isolating the faulty generator, a power plant may be protected from a total shut down.

In additional embodiments, a power management system (PMS) is provided to aid the relay device in identifying faulty generators with a higher degree of certainty. The power management system may monitor several parameters related to and/or indicating performance of each of the generators in the system. For example, the power management system may compare values of one or more parameters measured for several of the generators in the system and detect if values of one or more parameters measured for one of the generators do not match respective values of the parameters measured for other generators of the system. If a measured value of a parameter measured for a first generator does not match the values of the parameter measured for the other generators, the power management system generates a fault signal indicating that the first generator is not operating normally. The power management system may send the generated fault signal to the relay device corresponding to the first generator. The relay device determines that the generator is faulty and generates the signal to shut down the generator and/or disconnect the generator only when it receives the fault signal for the generator from the power management system, in addition to detecting that the at least two parameters measured for the generator do not match respective pre-determined values of the parameters. This allows the relay device to determine that the generator is faulty with a higher degree of accuracy.

Certain embodiments of the present disclosure may include some, all, or none of these advantages. These advantages and other features will be more clearly understood from the following detailed description taken in conjunction with the accompanying drawings and claims.

Illustrative embodiments of the present disclosure are described in detail herein. In the interest of clarity, not all features of an actual implementation may be described in this specification. It will of course be appreciated that in the development of any such actual aspect, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1A:
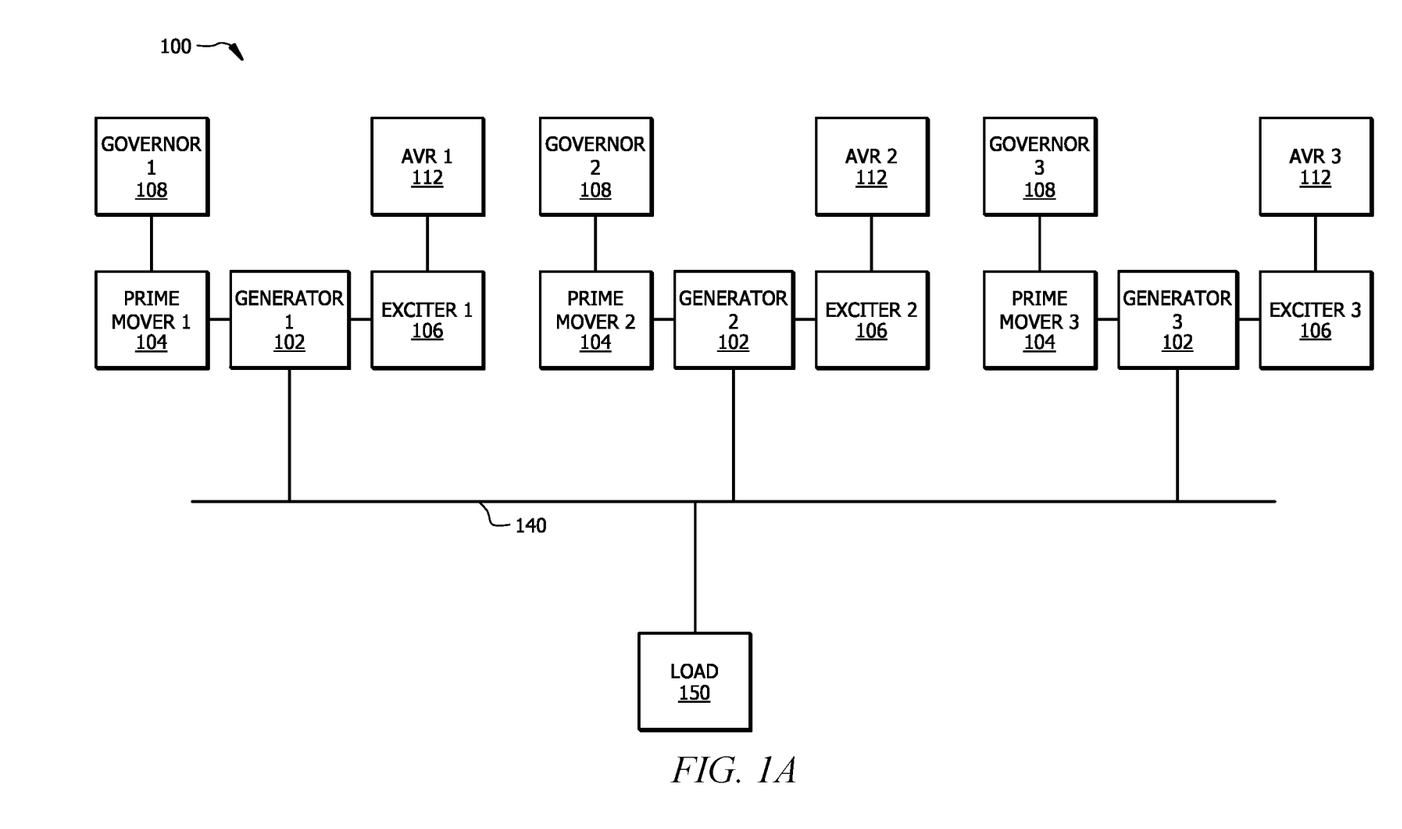
FIG. 1A illustrates an example power generation system in which embodiments of the present disclosure may be practiced.

FIG. 1A illustrates an example power generation system 100 in which embodiments of the present disclosure may be practiced. As shown in FIG. 1A, power generation system includes a plurality of electric power generators 102 (shown as generators 1-3) connected in parallel to a power bus 140. An electrical load 150 may connect to the power bus 140 and may draw electric power from the power bus 140 as needed. This configuration of the power generators 102 as shown in FIG. 1A is often referred to as a single bus configuration of power generators. As shown in FIG. 1A, each generator 102 is connected to a respective prime mover 104 (shown as prime movers 1-3) and an exciter 106 (shown as exciters 1-3). Each of the prime movers 104 is communicatively coupled to a respective speed governor (shown as governors 1-3). Each exciter 106 is communicatively coupled to a respective automatic voltage regulator (AVR) 112 (shown as AVRs 1-3). It may be noted that the power generation system 100 is shown to include three generators 102 for exemplary purposes only and a person having ordinary skill in the art can appreciate that the power generation system 100 can include any number of generators 102 connected in the single bus configuration, where each of the generators 102 has one or more of a prime mover 104, exciter 106, speed governor 108 and AVR 112.

As is well known in the art, an electric power generator 102 converts mechanical energy into electrical energy. The mechanical energy is generally produced by prime movers 104. Prime movers 104 are mechanical machines that convert primary energy of a fuel (e.g., fossil fuels) or fluid (e.g., water) into mechanical energy to drive a rotor of an electric power generator 102. Prime movers 104 are often referred to as turbines or engines. Fossil fuels commonly used in prime movers 104 include coal, gas, oil and nuclear fuel. In general, a prime mover 104 drives a power generator 102 directly, or through a transmission. The prime mover 104 is provided with a speed governor 108 that regulates the speed of the prime mover 104 and thus a speed or frequency of rotation of the rotor of the electric generator 102, according to electric generator frequency/power curves. In some cases, the prime mover 104 is provided with a servomotor that activates one or more control valves that regulate the fuel (or fluid) flow in the turbine, thus controlling the mechanical power at the turbine/engine shaft driving the rotor of the respective generator 102. Generally, the speed at the turbine/engine shaft is measured and compared with a reference speed. Based on this comparison, the speed governor 108 acts on the servomotor to open or close control valves to control the speed of the prime mover in a desired manner.

The main purpose of exciter 106 is to create an electromagnetic field in the generator coils. The stronger the magnetic field created, the stronger the electrical power produced. The strength of the magnetic field is adjusted by controlling the current to the generator field windings. This current is often referred to as excitation current. The excitation current to create the electromagnetic field is typically direct current (DC) which can range from 50 amps to 9000 amps and more depending on the size of the generator 102. In some cases, excitation power is generated by a small alternator whose armature is driven by a shaft of the main generator 102. The armature output leads are connected to a rectifier, which is also shaft mounted and rotating. The DC output of the rectifier is fed to the rotating field winding of the main generator 102. A source is required to create excitation before it can be self-sustained from the main generator 102. Excitation current and the voltage that drives it is controlled by the generator's voltage regulator (e.g., AVR 112), which is connected to the output terminals of the generator 102 through instrument transformers and voltage meters that monitor the output voltage. When the output voltage across the generator 102 shifts, the input from the voltage meter changes the signal to the voltage regulator. The voltage regulator controls the exciter 106 to increase (or decrease) the voltage to the field windings installed in the rotor of the main generator 102 to maintain the electromagnetic field at a desired level. An increased voltage at the field windings increases the current in the field coils, which makes the magnetic field stronger, thus increasing the output voltage of the generator 102. On the other hand, a decreased voltage at the field windings decreases the current in the field coils, which makes the magnetic field weaker, thus decreasing the output voltage of the generator 102.

The AC power generated by a generator 102 includes a real power component (measured as Kilo Watts, kW) and a reactive power component (measured as Kilovolt-Ampere Reactive, kVAr).

When multiple electric power generators 102 are connected in a single bus configuration as shown in FIG. 1, failure of one of the multiple power generators 102 can compromise the integrity of the entire power bus 140 and may lead to total power plant shutdown. A generator 102 may fail when a corresponding AVR 112 fails at maximum output and/or when a corresponding speed governor 108 fails at maximum output.

Faults Related to AVR Failure at Maximum Output

Reactive power is generated when the exciter 106, on command from a respective AVR 112, delivers excitation current to the field coils of the generator 102. The AVR 112 receives feedback from a main switchboard (not shown) and adjusts the excitation current to maintain the voltage to a desired level, and to provide the reactive power (kVAr) demanded by the load 150. A switchboard is a term used in the power industry for a component of an electrical distribution system which divides an electrical power feed into branch circuits while providing a protective circuit breaker or fuse for each circuit in a common enclosure. In this context, the switchboard may receive a power feed from the power bus 140 and may distribute power to the load 150. The switchboard may further include sensors to measure various parameters including real power, reactive power, voltage and current at the power bus 140.

As generators 102 are connected in a single bus configuration, the reactive power demanded by load 150 is shared equally among all the generators 102 (e.g., generators 1-3) as shown in FIG. 1A, provided they are of the same size and have similar design. For example, assuming generators 1-3 are of the same size and having the similar design, and load 150 requires 1500 kVAr, each of the generators 1-3 is controlled by respective AVRs 1-3 to produce 500 kVArs. Any increase or decrease on kVAr demand will also be distributed equally among all the generators 102, assuming all generators 102 are of the same size and similar design. Thus, any increase or decrease in the demand for reactive power will also be equally distributed among all generators 102.

An AVR 112 may fail as a result of several reasons including failure of internal components of the AVR 112 and/or loss of feedback signal from the main switchboard. At maximum output, an AVR 112 may direct a corresponding exciter 106 to deliver maximum excitation current to the connected generator 102. For example, when AVR1 is operating at maximum output, AVR1 directs exciter 1 to deliver maximum excitation current to generator 1. When the AVR 112 of an online generator 102 fails at maximum output, the AVR 112 may be stuck at delivering maximum excitation current to the corresponding generator 102. Consequently, the reactive power output of the generator 102 may reach the maximum value or beyond.

Following the above example, where load 150 requires 1500 kVAr in reactive power, the rated reactive power output of each of the generators 1-3 is 2000 kVAr. In this example, AVR 1 of generator 1 experiences a failure at maximum output. Under these fault conditions generator 1 may produce about 250% of the rated reactive power, which is about 5000 kVAr. The load 150 may continue consuming 1500 kVAr, while the healthy generators 2 and 3 may need to absorb the reactive power remaining in the system, which is about 3500 kVAr. Depending on their design, the healthy generators 2 and 3 may or may not be able to absorb such a large amount of reactive power without complications. In this context, a healthy generator refers to a generator that is operating normally.

Figure 1B:
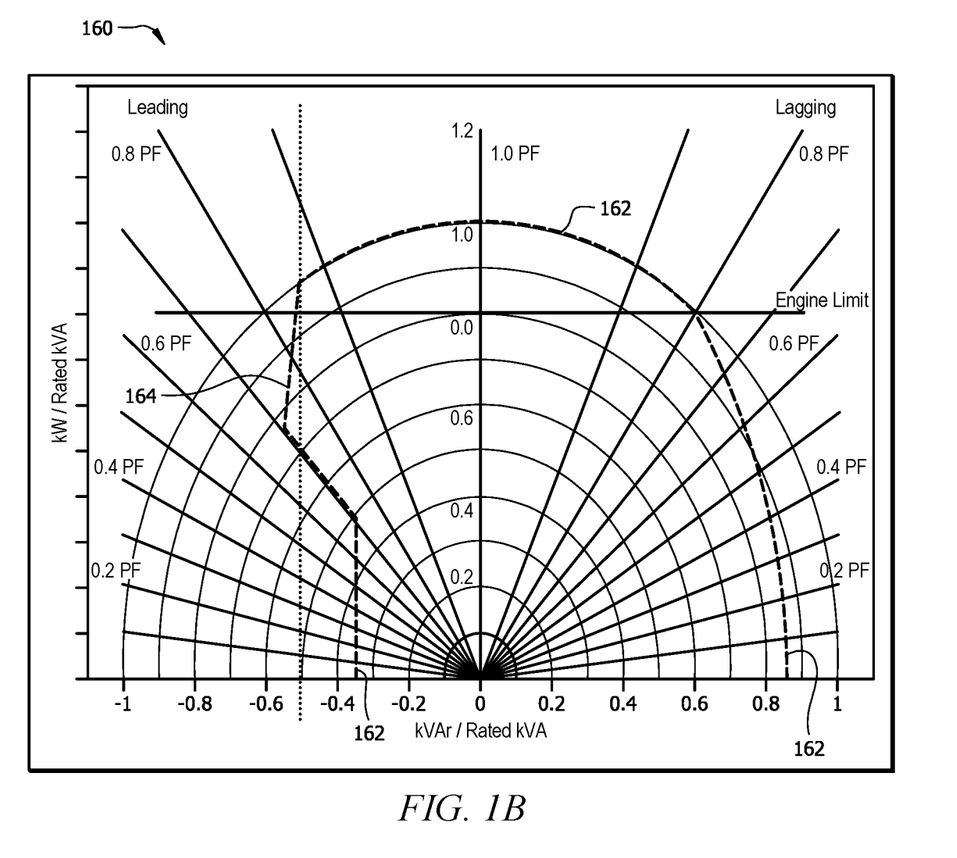
FIG. 1B illustrates an example plot of reactive power capability curves of a generator.

If the healthy generators manage to absorb the additional reactive power, the system voltage may remain unchanged. In this case, generators 2 and 3 need to absorb 1750 kVAr each, or 87.5% of rated value (0.875 per unit, PU). FIG. 1B illustrates example plot 160 of reactive power capability curves of generators 1-3 discussed in the above example.

The generators 1-3 need to operate to the left of the curve 162, on the right half of the plot 160, to prevent overheating of the generator rotors and to the right of the curve 162, on the left half of plot 160, to ensure stable operation. Protection systems (e.g., programmable relays) are generally provided and are programmed to trip generators operating outside these limits. The healthy generators 2 and 3 in the example will have to absorb −0.875 PU of rated reactive power of the generators. As may be seen from FIG. 1B, under these conditions, both generators 2 and 3 may be clearly operating outside their stability limits, and therefore generators 2 and 3 may be tripped by the protection system if the fault in generator 1 is left unattended. Additionally, the faulty generator 1 may also trip as a result of overcurrent leading to total power plant shutdown. Thus, even when a generator can absorb the additional reactive power in the system, it may lead to the generator operating outside stability limits. Consequently, the protection system may trip the generator.

In some cases, AVRs 112 can be programmed to prevent the healthy generators 2 and 3 from absorbing reactive power beyond the stability limits of the respective generators. In those cases, an excess reactive power in the system may create an overvoltage condition and cause the generators 2 and 3 to operate outside stability limits. In the example plot 160, curve 164 shows that a generator can absorb up to 50% of its rated reactive power output (e.g., about 1000 kVAr) when the system is operating at power factors above 0.7, without exceeding the stability limits. If the AVRs 112 of the example are programmed such that the generators 1-3 can only absorb 1000 kVAr each, there may be an excess of 1500 kVAr in the system. Under these conditions, the faulty generator 1 may increase the system voltage, likely above the setpoint of the overvoltage protection setpoint. If the faulty generator is not tripped immediately, the overvoltage protection of relays corresponding to the healthy generators 2 and 3 may trip all the online generators, causing a total power plant shutdown.

Faults Related to Speed Governor Failure at Maximum Output

Real power (measured in kW) is generated when fuel (e.g., fossil fuels) is supplied to a generator prime mover 104 (e.g., diesel engine, gas turbine, etc.). The real power demanded by the load 150 is shared equally among all the online generators 102, provided they are of the same size and of a similar design. Any increase or decrease in real power consumption is also shared equally among all the generators 102. The respective speed governor 108 of the prime mover 104 receives feedback from the main switchboard and adjusts the fuel input to the prime mover 104 to maintain the frequency of the generator at the desired level, and to provide the generator's share of real power demanded by the load 150.

A speed governor 108 may fail as a result of failure of internal components of the speed governor 108 and/or loss of feedback signal from the main switchboard. When the speed governor 108 of one generator 102 fails at maximum output, the speed governor 108 may be stuck at delivering maximum fuel to the respective prime mover 104. In such a case, the real power output of the respective generator 102 may no longer be the same as the real power output of other generators in the power generation system 100.

For example, the rated real power output of the generators 1-3 shown in FIG. 1A is 2600 kW, and the speed governor 1 of generator 1 experiences a failure at maximum output and is stuck at delivering maximum fuel to the prime mover 1. Under these fault conditions generator 1 may produce about 110% of the rated power, which is about 2860 kW. However, the load 150 continues consuming 1500 kW. In this case, the other healthy generators 2 and 3 absorb an estimated 10% of rated power each. There is no way to dispose the spare real power in the system 100. Consequently, generator 1 speeds up causing an over-frequency condition in generator 1. In this context, an over-frequency condition refers to the rotor of the generator rotating at a frequency outside normal operating conditions of the generator. If the faulty generator 1 is not disconnected from the power bus 140 quickly, the protection system (e.g., programmable relays) may trip the healthy generators 2 and 3 as a result of reverse power and/or over-frequency, as well as the faulty generator 1 as a result of over-frequency and/or overload, causing a total power plant shutdown. In this context, a reverse power condition occurs when a generator 102 starts drawing real power from the system like an engine, instead of generating real power.

As can be appreciated from the above discussion, it is important that the faulty generator 102 is identified promptly and disconnected from the power bus 140 to avoid cascading failures across entire groups of power generators 102 connected to the power bus that can potentially lead to total power plant shutdown.

Embodiments of the present disclosure discuss a system and methods implemented by the system for identifying a fault in an electric power generator of a plurality of generators connected in a single bus configuration and disconnecting the faulty generator from a common power bus, before the fault escalates and propagates to other healthy generators leading to a total power plant shut down.

Figure 2:
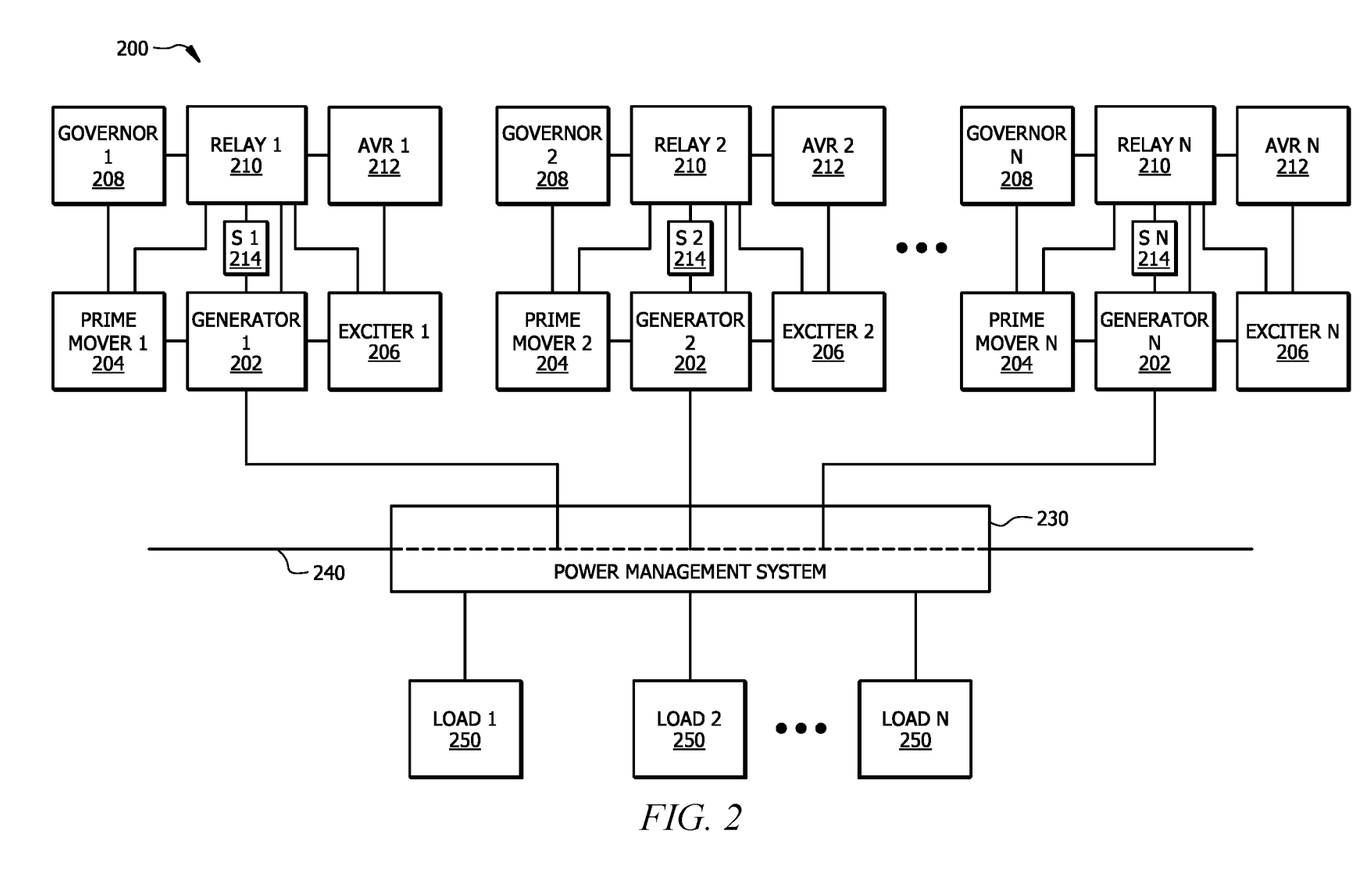
FIG. 2 illustrates an example power generation system, in accordance with one or more embodiments of the present disclosure.

FIG. 2 illustrates an example power generation system 200 (or power plant), in accordance with one or more embodiments of the present disclosure. As shown in FIG. 2, power generation system 200 includes a plurality of electric power generators 202 (shown as generators 1-N) connected in parallel to a power bus 240. One or more electrical loads 250 (shown as loads 1-N) may connect to the power bus 240 and may draw electric power from the power bus 240 as needed. This configuration of power generators 202 as shown in FIG. 2 is often referred to as a single bus configuration of power generators. As shown in FIG. 2, each generator 202 is connected to a respective prime mover 204 (shown as prime movers 1-N) and an exciter 206 (shown as exciters 1-N). Each of the prime movers 204 is communicatively coupled to a respective speed governor 208 (shown as governors 1-N). Each exciter 206 is communicatively coupled to a respective automatic voltage regulator (AVR) 212 (shown as AVR 1-N). Each of the generators 202 is further communicatively coupled to a relay device (e.g., a programmable relay device) 210 (shown as relays 1-N) and a switch 214 (shown as S1-SN). Each switch 214 is controllable by the respective relay device 210 to turn ON and shut down the respective generator 202. It may be noted that the power generation system 200 can include any number of generators 202 connected in the single bus configuration, where each of the generators 202 has one or more of a prime mover 204, exciter 206, speed governor 208, AVR 212, relay 210 and switch 214.

A power management system 230 is provided for optimizing usage of the generators 202, electricity generation from the generators 202 and distributing power to loads 250. The power management system 230 may include one or more switchgears for distribution of power to loads 250 and one or more emergency generator sets. Other functions of the power management system 230 include, but are not limited to, prioritization of loads 250, emergency load shedding (e.g., shutting down non-essential equipment) and prestart of generators 202 (e.g., when additional power to start a big crude pump is required). In an embodiment, the power management system is a Programmable Logic Control (PLC) based system.

The operations of the prime mover 204, exciter 206, speed governor 208 and AVR 212 are similar to those of prime mover 104, exciter 106, speed governor 108 and AVR 112 respectively as described with reference to FIG. 1A above and will not be described here again. Each of the relay devices 210 is designed to detect a fault in a generator 202 connected to the relay device 210 and generate a signal to shut down the faulty generator 202. In one embodiment, the switch 214 may be a circuit breaker and the relay device 210 may be designed to trip the circuit breaker when a fault is detected in order to shut down the faulty generator and/or disconnect the faulty generator from the power bus 240. In certain embodiments the relay device 210 may be a microprocessor-based digital protection relay which can be programmed to detect a fault in a generator 202 based on detecting one or more fault conditions related to the performance of the generator 202. For example, sensors may be provided throughout the power management system 200 for measuring several parameters related to the performance of each generator 202. These parameters may include but are not limited to a voltage produced by a generator, a real power produced by a generator 202, a reactive power produced by a generator 202, a frequency of a generator 202 (e.g., frequency of rotation of the generator rotor), excitation current provided to a generator 202 and a control signal generated by a speed governor 208. Each of these parameters affect and/or indicate the performance of the generator and can help the relay device 210 determine whether the generator 202 is operating normally or is faulty. The relay device 210 may be configured (e.g., hardwired or programmed) to monitor one or more of these parameters related to the performance of the generator and determine whether the generator is faulty based on the values of one or more of these parameters as measured by corresponding sensors.

In one embodiment, the relay device 210 may be configured to determine that a generator 202 is faulty in response to detecting that values of one or more parameters related to the performance of the generator are outside the respective rated limits of the parameters for the generator or are outside pre-determined limits set of the parameters. The rated limits or pre-determined value limits for one or more parameters may include ranges of values of the respective parameters. For example, the relay device 210 may determine whether measured values of reactive power produced by a generator satisfy the rated reactive power capability curves of the generator as described with reference to FIG. 1B. The relay device 210 may determine that a generator 202 is faulty if the measured values of reactive power for the generator 202 are outside the rated value ranges as shown by the reactive power capability curves of the generator 202. Similarly, the relay device 210 may be configured to determine that a generator 202 is faulty when the excitation current provided to the generator 202 is outside a rated or pre-determined range of values, the real power produced by the generator 202 is outside a rated or pre-determined range of values, a current produced by the generator 202 is outside a rated or pre-determined range of values, a voltage produced by the generator 202 is outside a rated or pre-determined range of values, a frequency of the generator 202 is outside a rated or pre-determined range of values, the speed governor signal provided to the prime mover 204 of the generator 202 is set outside a rated or pre-determined range of values or a combination thereof.

In certain embodiments, the power management system 230 may be designed to aid the relay devices 210 in identifying and isolating faulty generators 202 in order to protect system 200 from escalation of single generator faults and avoid consequential total power plant shutdown. The power management system 230 may be configured (e.g., hardwired or programmed) to monitor several parameters related to and/or indicating performance of each of the generators 202. These parameters may include but are not limited to a voltage produced by a generator, a real power produced by a generator 202, a reactive power produced by a generator 202, a frequency of a generator 202 (e.g., frequency of rotation of the generator rotor), excitation current provided to a generator 202 and a control signal generated by a speed governor 208. The power management system 230 may be configured to compare values of one or more of these parameters measured for several of the generators 202 and detect if measured values for one of the generators 202 do not match respective measured values for other generators of the system 200. For example, the power management system 230 compares values of a parameter measured for a first generator 202 to respective values of the parameter measured for at least two other generators 202 of the system 200. If the measured value of the parameter measured for the first generator 202 do not match the values of the parameter measured for the other generators 202, the power management system 230 generates a fault signal indicating that the first generator 202 is not operating normally. The power management system 230 may send the generated fault signal corresponding to the first generator 202 to the relay device 210. In one embodiment, the power management system 230 generates the fault signal for a first generator 202 when a value of a parameter measured for the first generator differs from values of the parameter measured for each of at least two other generators 202 by at least a predetermined threshold amount.

The relay device 210 may have already detected that the first generator is faulty in the manner described above and may use the fault signal from power management system 230 as a further confirmation that the first generator is faulty. In some embodiments, the relay device 210 generates a signal to shut down a generator 202 only when the relay device 210 receives a fault signal related to the generator 202 from the power management system 230 in addition to determining on its own that the generator 202 is faulty. This ensures that the relay device 210 determines a generator 202 is faulty with a higher degree of certainty.

It may be noted that while methods described herein for identifying and isolating faulty generators are described in the context of generators connected in a single bus configuration, a person having ordinary skill in the art can appreciate that the methods described herein can be implemented to identify faulty generators connected in any configuration.

Figure 3:
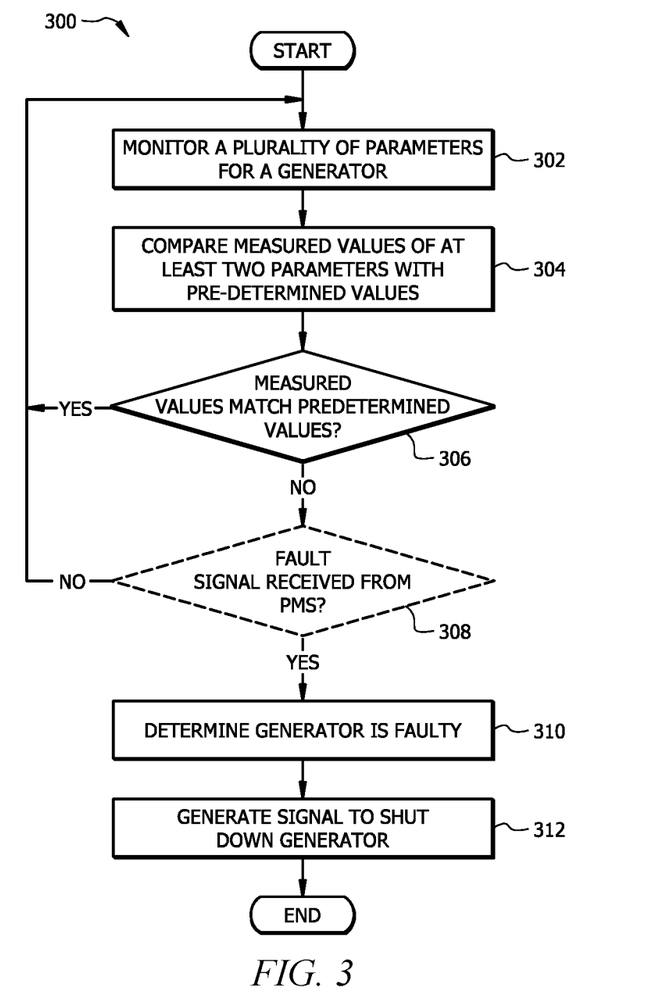
FIG. 3 illustrates a flow chart of an example method for identifying and isolating a faulty electric power generator, in accordance with one or more embodiments of the present disclosure.

FIG. 3 illustrates a flow chart of an example method 300 for identifying and isolating a faulty electric power generator, in accordance with one or more embodiments of the present disclosure. In certain embodiments, method 300 may be performed by a relay device 210 as shown in FIG. 2.

At step 302, a relay device 310 monitors a plurality of parameters related to performance of a generator 202. For example, relay device 1 monitors a plurality of parameters related to performance of generator 1 as shown in FIG. 2. In one embodiment, the relay device 210 monitors at least two parameters related to performance of the generator 202. For example, sensors may be provided throughout the power management system 200 for measuring several parameters related to the performance of each generator 202. The relay device 210 may be configured to obtain/receive measured values of these parameter from the respective sensors. These parameters may include but are not limited to a voltage produced by a generator, a real power produced by a generator 202, a reactive power produced by a generator 202, a frequency of a generator 202 (e.g., frequency of rotation of the generator rotor), excitation current provided to a generator 202 and a control signal generated by a speed governor 208. Each of these parameters affect and/or indicate the performance of the generator and can help the relay determine whether the generator is operating normally or is faulty. The relay device 210 may be configured (e.g., hardwired or programmed) to monitor one or more of these parameters related to the performance of the generator and determine whether the generator is faulty based on the values of one or more of these parameters as measured by corresponding sensors.

At step 304, the relay device 210 compares the measured values of each of the plurality of parameters with respective pre-determined values of the parameter. The pre-determined values of the parameters may include rated values of the parameters for the particular generator or other pre-determined values set for the generator. The rated limits or pre-determined value limits for one or more parameters may include ranges of values of the respective parameters.

At step 306, relay device 210 checks whether the measured values of at least two of the parameters match with the respective pre-determined values of the parameters. In certain embodiments, the relay device 210 may be configured to determine that the generator 202 is faulty in response to detecting that the values of the at least two parameters measured for the generator 202 do not match the respective pre-determined values of the parameters for the generator 202. For example, the relay device 210 may be configured to determine that a generator 202 is faulty in response to detecting that values of the parameters related to the performance of the generator 202 are outside the respective rated limits of the parameters for the generator 202 or are outside pre-determined value limits set for the parameters. The rated value limits or pre-determined value limits for one or more parameters may include ranges of values of the respective parameters. For example, the relay device 210 may determine whether measured values of reactive power produced by a generator satisfy the rated reactive power capability curves of the generator as described with reference to FIG. 1B. Similarly, the relay device 210 may be configured to determine whether the excitation current provided to the generator is outside a rated or pre-determined range of values, the real power produced by the generator is outside a rated or pre-determined range of values, a current produced by the generator is outside a rated or pre-determined range of values, a voltage produced by the generator is outside a rated or pre-determined range of values, a frequency of the generator is outside a rated or pre-determined range of values, the speed governor signal provided to the prime mover 204 of the generator is set outside a rated or pre-determined range of values or a combination thereof. The relay device 210 may be configured to determine that the generator 202 is faulty when measured values of any two of the above parameters are outside respective rated or pre-determined ranges of values.

In one embodiment, relay device 210 monitors the reactive power produced by a generator 202 and the excitation current provided to the generator. The relay device 210 generates a command to shut down the generator 202 and/or disconnect the generator 202 from the power bus 240 in response to detecting that both the excitation current and the reactive power measured for the generator 202 have equaled or exceeded pre-determined threshold values for the excitation current and reactive power respectively. In an embodiment, the relay device 210 generates the signal to trip the generator 202 only when both these conditions are met to ensure that the fault in the generator 202 is detected accurately and false detection of generator faults are avoided. The pre-determined values of each of the reactive power and the excitation current are set to a respective rated value of the generator 202 or other pre-determined value. In an embodiment, the pre-determined values of the reactive power and the excitation current are selected based on the design and configuration of the power generation system 200. For example, the pre-determined values may be selected based on how much reactive power can be safely absorbed by other health generators 202 and loads 250 of system 200 without tripping the healthy generators 202. In one embodiment, the predetermined values of each of the reactive power and the excitation current is set to a maximum value that may not cause the faulty generator and/or the other generators 202 to trip.

As described above, when an AVR 212 fails at maximum output, the excitation current provided to the generator may increase significantly causing a substantial increase in the reactive power generated by the respective generator 202, which may lead to a total power plant shutdown. By promptly detecting that the excitation current and resulting reactive power has equaled or exceeded pre-determined threshold values and tripping (or disconnecting) the faulty generator 202 as described above, the relay device 210 may protect the system 200 from a potential total shutdown. This method for protecting system 200 may be particularly important when system 200 does not include sufficient number of generators 202 to be able to absorb the excess reactive power generated by the faulty generator 202. Under these conditions, they system load 250 and the healthy generators 202 may not be able to absorb the excess reactive power in the system 200. Consequently, the voltage of the system 200 may increase and remain above rated values until the fault is cleared. If the magnitude of the overvoltage exceeds the overvoltage protection setpoint, all the online generators 202 may trip resulting in total power plant shutdown. Even when the healthy generators 202 can absorb the excess reactive power in the system, the healthy generators 202 may start operating outside rated reactive power limits of the generators 202 and may consequently trip. The method described above may protect the system 200 in both these conditions from a total power plant shutdown.

In another embodiment, relay device 210 monitors the real power produced by a generator 202 and the governor control signal from a speed governor 208 controlling frequency of the generator. The relay device 210 generates a command to shut down the generator 202 and/or disconnect the generator 202 from the power bus 240 in response to detecting that both the governor control signal and the real power measured for the generator 202 have equaled or exceeded pre-determined threshold values for the governor control signal and real power respectively. In an embodiment, the governor control signal is determined to equal or exceed a predetermined threshold, when the governor control signal set to cause the frequency of the generator 202 to equal or exceed a threshold frequency of the generator 202. In an embodiment, the relay device 210 generates the signal to trip the generator 202 only when both these conditions are met to ensure that the fault in the generator 202 is detected accurately and false detection of generator faults are avoided. The pre-determined values of each of the real power and the generator frequency are set to a respective rated value of the generator 202 or other pre-determined value. In an embodiment, the pre-determined values of the real power and the generator frequency are selected based on the design and configuration of the power generation system 200. For example, the pre-determined values may be selected based on how much real power can be safely absorbed by the system 200 without tripping the healthy generators 202. In one embodiment, the predetermined values of each of the real power and the generator frequency is set to a maximum value that may not cause the faulty generator and/or the other generators 202 to trip.

As described above, when the speed governor fails at maximum output, the speed governor 208 increases the fuel supply to the prime mover 204 significantly, causing a substantial increase in real power generated by the generator 202. If the faulty generator 202 is not disconnected from the power bus 240 quickly, all generators 202 of system 200 may trip due to over-frequency and/or reverse power condition. By promptly detecting that the governor control signal has caused the generator frequency to equal or exceed a pre-determined threshold frequency and that the real power output of the generator 202 has increased to equal or exceed a pre-determined threshold real power value, and shutting down (or disconnecting) the faulty generator, the relay device 210 may protect the system 200 from a potential total shutdown.

At optional step 308, the relay device 210 optionally checks whether it has received a fault signal from the power management system 230. In certain embodiments, the power management system 230 may be designed to aid the relay device 210 in identifying and isolating faulty generators 202 in order to protect system 200 from escalation of single generator faults and avoid consequential total power plant shutdown. The power management system 230 may monitor several parameters related to and/or indicating performance of each of the generators 202. These parameters may include but are not limited to a voltage produced by a generator, a real power produced by a generator 202, a reactive power produced by a generator 202, a frequency of a generator 202 (e.g., frequency of rotation of the generator rotor), excitation current provided to a generator 202 and a control signal generated by a speed governor 208. The power management system 230 may compare values of one or more of these parameters measured for several of the generators 202 and detect if measured values for one of the generators 202 do not match respective values for other generators of the system 200. For example, the power management system 230 compares values of a parameter measured for a first generator 202 to respective values of the parameter measured for at least two other generators 202 of the system 200. If the measured value of the parameter measured for the first generator does not match the values of the parameter measured for the other generators, the power management system generates a fault signal indicating that the first generator is not operating normally. The power management system 230 may send the generated fault signal to the relay device 210 corresponding to the first generator 202. In one embodiment, the power management system 230 generates the fault signal for a first generator when a value of a parameter measured for the first generator differs from values of the parameter measured for each of at least two other generators by at least a predetermined threshold amount.

At step 310, the relay device 210, in response to determining that values of at least two parameters measured for the generator 202 do not match respective pre-determined values of the parameters and optionally in response to receiving a fault signal related to the generator 202 from the power management system, determines that the generator 202 is faulty.

At step 312, the relay device generates a signal to shut down the faulty generator 202 and/or disconnect the generator 202 from the power bus 240. In certain embodiments, the relay device 210 may control a switch 214 to shut down and/or disconnect the generator 202. The switch 214 may be a circuit breaker and the relay device 210 may be designed to trip the circuit breaker when a fault is detected in order to shut down the faulty generator and/or disconnect the faulty generator from the power bus 240.

In an optional embodiment, the relay device 210 determines that the generator is faulty and generates the signal to shut down and/or disconnect the generator 202 only when it receives the fault signal for the generator 202 from the power management system, in addition to detecting that the at least two parameters measured for the generator 202 do not match respective pre-determined values of the parameters. In this embodiment, the fault signal received from the power management system is used as a further confirmation that the generator 202 is faulty. This slows the relay 210 to determine that the generator 202 is faulty with a higher degree of accuracy as compared to determining the generator 202 is faulty based only on examining the at least two parameters as described above. For example, the relay device 210 may have already detected that the first generator is faulty based on the at least two parameters equaling or exceeding respective pre-determined values of the parameters in the manner described above. The relay device 210 may use the fault signal from power management system 230 as a further confirmation that the first generator is faulty.

It may be noted that the order of the steps presented in the method 300 above can be varied—for example, blocks can be reordered, combined, removed, and/or broken into sub-blocks. Certain steps or processes can also be performed in parallel.

Figure 4:
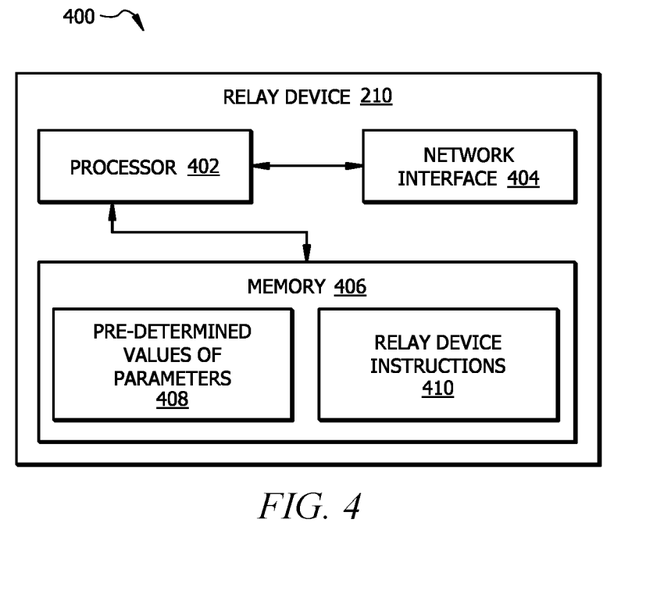
FIG. 4 illustrates an example schematic diagram of a relay device, in accordance with one or more embodiments of the present disclosure.

FIG. 4 illustrates an example schematic diagram of the relay device 210, in accordance with one or more embodiments of the present disclosure.

The relay device 210 comprises a processor 402, a network interface 404 and a memory 406. The relay device 210 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (relay device instructions 410) to implement the relay device 210. In this way, processor 402 may be a special-purpose computer designed to implement the functions disclosed herein. In one or more embodiments, the relay device 210 is implemented using logic units, FPGAs, ASICs, DSPs, or any other suitable hardware. The relay device 210 is configured to operate as described with reference to FIGS. 2-3. For example, the relay device 210 may be configured to perform at least a portion of the flowchart 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the relay device instructions 410 and/or any other data or instructions including pre-determined values of one or more parameters affecting and/or indicating performance of one or more generators. The relay device instructions 410 may include any suitable set of instructions, logic, rules, or code operable to execute the relay device 210.

The network interface 404 is configured to enable wired and/or wireless communications. The network interface 404 is configured to communicate data between the relay device 210 and other devices (e.g. sensors provided throughout system 200 for measuring several parameters, power management system 230, generator 202, prime mover 204, exciter 206, speed governor 208 and AVR 212), systems, or domains. For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that at least a portion of the power management system 230 may be implemented similar to the relay device as shown in FIG. 4. For example, the power management system 230 may include a processor and a memory storing instructions to implement the respective functionality of the power management system 230 when executed by the processor.

As used below, any reference to a series of examples is to be understood as a reference to each of those examples disjunctively (e.g., "Examples 1-4" is to be understood as "Examples 1, 2, 3, or 4").

Example 1 is an apparatus comprising at least one processor configured to: receive measurements of a plurality of parameters related to performance of one or more of a plurality of generators; detect, based on the measurements, that values of at least two of the plurality of parameters measured for a first generator of the one or more generators do not match respective predetermined values of the at least two parameters for the first generator; determine based at least on the detecting that the first generator is faulty; and generate a signal to perform at least one of shutting down the first generator or disconnecting the first generator from at least one second generator of the plurality of generators, in response to determining that the first generator is faulty.

Example 2 an apparatus of example 1, wherein: the at least two parameters comprise a reactive power generated by the first generator and an excitation current provided to the first generator; and the at least one processor is configured to detect that the values of the at least two parameters measured for the first generator do not match respective predetermined values of the at least two parameters for the first generator by detecting that measured values of the reactive power and the excitation current of the first generator equal or exceed respective predetermined values of the reactive power and the excitation current for the first generator.

Example 3 is an apparatus of example 1, wherein: the at least two parameters comprise a real power generated by the first generator and a governor control signal generated by a speed governor to control a frequency of rotation of a rotor of the first generator as driven by a prime mover; and wherein the at least one processor is configured to detect that the values of the at least two parameters measured for the first generator do not match respective predetermined values of the at least two parameters for the first generator by detecting that a measured value of the real power equals or exceeds a predetermined value of the real power for the first generator and the governor control signal is set to drive the frequency of rotation of the rotor to equal or exceed a predetermined frequency of rotation for the first generator.

Example 4 is an apparatus of example 1, wherein the at least one processor is further configured to: receive a fault signal corresponding to the first generator from a power management sub-system, wherein the fault signal indicates that a value of at least one of the plurality of parameters measured for the first generator does not match a corresponding value of the at least one parameter measured for at least two other generators; and generate the signal to shut down the first generator in response to determining that the first generator is faulty and additionally based on receiving the fault signal for the first generator from the power management sub-system.

Example 5 is an apparatus of example 4, wherein the plurality of parameters comprises one or more of a current produced by a generator, a voltage produced by a generator, a real power produced by a generator, a reactive power produced by a generator and a frequency of a generator.

Example 6 is an apparatus of example 1, wherein: the predetermined values for each of the at least two parameters is a predetermined range of values for the parameter; and the at least one processor is configured to detect that values of the at least two parameters measured for the first generator do not match respective predetermined values of the at least two parameters by detecting that each of the at least two parameters is outside a respective range of values for the parameter.

Example 7 is an apparatus of example 1, wherein the signal to shut down the first generator comprises a trip signal to trip a breaker switch that shuts down the first generator.

Example 8 is an apparatus of example 1, wherein the plurality of generators are connected in parallel to a single power bus, wherein at least one electrical load draws power from the power bus.

Example 9 is a method for managing a plurality of generators, comprising: receiving measurements of a plurality of parameters related to performance of one or more of the plurality of generators; detecting, based on the measurements, that values of at least two of the plurality of parameters measured for a first generator of the one or more generators do not match respective predetermined values of the at least two parameters for the first generator; determining based at least on the detecting that the first generator is faulty; and generating a signal to perform at least one of shutting down the first generator or disconnecting the first generator from at least one second generator of the plurality of generators, in response to determining that the first generator is faulty.

Example 10 is a method of example 9, wherein: the at least two parameters comprise a reactive power generated by the first generator and an excitation current provided to the first generator; and detecting that the values of the at least two parameters measured for the first generator do not match respective predetermined values of the at least two parameters for the first generator comprises detecting that measured values of the reactive power and the excitation current of the first generator equal or exceed respective predetermined values of the reactive power and the excitation current for the first generator.

Example 11 is a method of example 9, wherein: the at least two parameters comprise a real power generated by the first generator and a governor control signal generated by a speed governor to control a frequency of rotation of a rotor of the first generator as driven by a prime mover; and detecting that the values of the at least two parameters measured for the first generator do not match respective predetermined values of the at least two parameters for the first generator comprises detecting that a measured value of the real power equals or exceeds a predetermined value of the real power for the first generator and the governor control signal is set to drive the frequency of rotation of the rotor to equal or exceed a predetermined frequency of rotation for the first generator.

Example 12 is a method of example 12, further comprising: receiving a fault signal corresponding to the first generator from a power management sub-system, wherein the fault signal indicates that a value of at least one of the plurality of parameters measured for the first generator does not match a corresponding value of the at least one parameter measured for at least two other generators; and generating the signal to shut down the first generator in response to determining that the first generator is faulty and additionally based on receiving the fault signal for the first generator from the power management sub-system.

Example 13 is an example of example 12, wherein the plurality of parameters comprises one or more of a current produced by a generator, a voltage produced by a generator, a real power produced by a generator, a reactive power produced by a generator and a frequency of a generator.

Example 14 is an example of example 9, wherein the predetermined values for each of the at least two parameters is a predetermined range of values for the parameter, and wherein detecting that values of the at least two parameters measured for the first generator do not match respective predetermined values of the at least two parameters comprises detecting that each of the at least two parameters is outside a respective range of values for the parameter.

Example 15 is a system, comprising: a plurality of generators for producing electrical power; and at least one relay device for detecting a faulty generator of the plurality of generators, wherein the at least one relay device is configured to: receive measurements of a plurality of parameters related to performance of one or more of the plurality of generators; detect, based on the measurements, that values of at least two of the plurality of parameters measured for a first generator of the one or more generators do not match respective predetermined values of the at least two parameters for the first generator; determine based at least on the detecting that the first generator is faulty; and generate a signal to perform at least one of shutting down the first generator or disconnecting the first generator from at least one second generator of the plurality of generators, in response to determining that the first generator is faulty.

Example 16 is an example of example 15, further comprising: an automatic voltage regulator to control an excitation current provided to the first generator; wherein: the at least two parameters comprise a reactive power generated by the first generator and the excitation current provided to the first generator; and detecting that the values of the at least two parameters measured for the first generator do not match respective predetermined values of the at least two parameters for the first generator comprises detecting that measured values of the reactive power and the excitation current of the first generator equal or exceed respective predetermined values of the reactive power and the excitation current for the first generator.

Example 17 is an example of example 15, further comprising: a prime mover to drive a rotor of the first generator; and a speed governor to control a frequency of rotation of the rotor driven by the prime mover, wherein the speed governor generates a governor control signal to control the frequency of rotation driven by the prime mover; wherein: the at least two parameters comprise a real power generated by the first generator and the governor control signal; and detecting that the values of the at least two parameters measured for the first generator do not match respective predetermined values of the at least two parameters for the first generator comprises detecting that a measured value of the real power equals or exceeds a predetermined value of the real power for the first generator and the governor control signal is set to drive the frequency of rotation to equal or exceed a predetermined frequency of rotation for the first generator.

Example 18 is an example of example 15, further comprising: a power management sub-system for comparing values of each of the plurality of parameters measured for the first generator to respective values of the parameter measured for at least two other generators of the plurality of generators; detecting that a value of at least one of the plurality of parameters measured for the first generator does not match a corresponding value of the at least one parameter measured for the at least two other generators; and transmitting a fault signal corresponding to the first generator to the relay device.

Example 19 is an example of example 18, wherein the relay device is configured to generate the signal in response to determining that the first generator is faulty and additionally based on receiving the fault signal from the power management sub-system.

Example 20 is an example of example 15, wherein the plurality of generators are connected in parallel to a single power bus, wherein at least one electrical load draws power from the power bus.

Therefore, the present disclosure is well adapted to attain the ends and advantages mentioned as well as those that are inherent therein. The particular aspects disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the elements that it introduces.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An apparatus, comprising:
   at least one processor configured to:
   receive measurements of a plurality of parameters related to performance of one or more of a plurality of generators, wherein each of the plurality of generators is initially coupled to a bus;
   detect, based on the measurements, that values of at least two of the plurality of parameters measured for a first generator of the one or more generators do not match respective predetermined values of the at least two parameters for the first generator;
   determine based at least on the detecting that the first generator is faulty;
   generate a signal to disconnect the first generator from at least one second generator of the plurality of generators, in response to determining that the first generator is faulty;
   wherein the at least two parameters comprise a real power generated by the first generator and a governor control signal generated by a speed governor to control a frequency of rotation of a rotor of the first generator as driven by a prime mover; and
   wherein the at least one processor is configured to detect that the values of the at least two parameters measured for the first generator do not match respective predetermined values of the at least two parameters for the first generator by detecting that a measured value of the real power equals or exceeds a predetermined value of the real power for the first generator and the governor control signal is set to drive the frequency of rotation of the rotor to equal or exceed a predetermined frequency of rotation for the first generator.

2. The apparatus of claim 1, wherein:
   the predetermined values for each of the at least two parameters is a predetermined range of values for the parameter; and
   the at least one processor is configured to detect that values of the at least two parameters measured for the first generator do not match respective predetermined values of the at least two parameters by detecting that each of the at least two parameters is outside a respective range of values for the parameter.

3. The apparatus of claim 1, wherein the signal to disconnect the first generator comprises a trip signal to trip a breaker switch that disconnects the first generator.

4. The apparatus of claim 1, wherein the bus is a single power bus, wherein the plurality of generators are connected in parallel to the single power bus, and wherein at least one electrical load draws power from the power bus.

5. An apparatus, comprising: of at least one processor configured to:
   receive measurements of a plurality of parameters related to performance of one or more of a plurality of generators, wherein each of the plurality of generators is initially coupled to a bus;

detect, based on the measurements, that values of at least two of the plurality of parameters measured for a first generator of the one or more generators do not match respective predetermined values of the at least two parameters for the first generator;

determine based at least on the detecting that the first generator is faulty;

generate a signal to disconnect the first generator from at least one second generator of the plurality of generators, in response to determining that the first generator is faulty;

receive a fault signal corresponding to the first generator from a power management sub-system, wherein the fault signal indicates that a value of at least one of the plurality of parameters measured for the first generator does not match a corresponding value of the at least one parameter measured for at least two other generators; and generate the signal to disconnect the first generator in response to determining that the first generator is faulty and additionally based on receiving the fault signal for the first generator from the power management sub-system.

6. The apparatus of claim 5, wherein the plurality of parameters comprises one or more of a current produced by a generator, a voltage produced by a generator, a real power produced by a generator, a reactive power produced by a generator and a frequency of a generator.

7. A method for managing a plurality of generators, comprising:

receiving measurements of a plurality of parameters related to performance of one or more of the plurality of generators, wherein each of the plurality of generators is initially coupled to a bus;

detecting, based on the measurements, that values of at least two of the plurality of parameters measured for a first generator of the one or more generators do not match respective predetermined values of the at least two parameters for the first generator;

determining based at least on the detecting that the first generator is faulty;

generating a signal to disconnect the first generator from at least one second generator of the plurality of generators, in response to determining that the first generator is faulty;

wherein the at least two parameters comprise a real power generated by the first generator and a governor control signal generated by a speed governor to control a frequency of rotation of a rotor of the first generator as driven by a prime mover; and detecting that the values of the at least two parameters measured for the first generator do not match respective predetermined values of the at least two parameters for the first generator comprises detecting that a measured value of the real power equals or exceeds a predetermined value of the real power for the first generator and the governor control signal is set to drive the frequency of rotation of the rotor to equal or exceed a predetermined frequency of rotation for the first generator.

8. The method of claim 7, wherein the predetermined values for each of the at least two parameters is a predetermined range of values for the parameter, and wherein detecting that values of the at least two parameters measured for the first generator do not match respective predetermined values of the at least two parameters comprises detecting that each of the at least two parameters is outside a respective range of values for the parameter.

9. A method, for managing a plurality of generators, comprising:

receiving measurements of a plurality of parameters related to performance of one or more of the plurality of generators, wherein each of the plurality of generators is initially coupled to a bus;

detecting, based on the measurements, that values of at least two of the plurality of parameters measured for a first generator of the one or more generators do not match respective predetermined values of the at least two parameters for the first generator;

determining based at least on the detecting that the first generator is faulty;

generating a signal to disconnect the first generator from at least one second generator of the plurality of generators, in response to determining that the first generator is faulty;

receiving a fault signal corresponding to the first generator from a power management sub-system, wherein the fault signal indicates that a value of at least one of the plurality of parameters measured for the first generator does not match a corresponding value of the at least one parameter measured for at least two other generators; and generating the signal to disconnect the first generator in response to determining that the first generator is faulty and additionally based on receiving the fault signal for the first generator from the power management sub-system.

10. The method of claim 9, wherein the plurality of parameters comprises one or more of a current produced by a generator, a voltage produced by a generator, a real power produced by a generator, a reactive power produced by a generator and a frequency of a generator.

11. A system comprising:

a plurality of generators for producing electrical power, wherein each of the plurality of generators is initially coupled to a bus; and at least one relay device for detecting a faulty generator of the plurality of generators, wherein the at least one relay device comprises a processor that is configured to:

receive measurements of a plurality of parameters related to performance of one or more of the plurality of generators;

detect, based on the measurements, that values of at least two of the plurality of parameters measured for a first generator of the one or more generators do not match respective predetermined values of the at least two parameters for the first generator;

determine based at least on the detecting that the first generator is faulty;

generate a signal to disconnect the first generator from at least one second generator of the plurality of generators, in response to determining that the first generator is faulty; and an automatic voltage regulator to control an excitation current provided to the first generator;

wherein:

the at least two parameters comprise a reactive power generated by the first generator and the excitation current provided to the first generator; and the processor is further configured to detect that the values of the at least two parameters measured for the first generator do not match respective predetermined values of the at least two parameters for the first generator comprises detecting that measured values of the reactive power and the excitation current of the first generator equal or exceed respective predetermined values of the reactive power and the excitation current for the first generator.

12. The system of claim 11, wherein the bus is a single power bus, wherein the plurality of generators are connected in parallel to a single power bus, and wherein at least one electrical load draws power from the power bus.

13. A system, comprising:
a plurality of generators for producing electrical power, wherein each of the plurality of generators is initially coupled to a bus; and
at least one relay device for detecting a faulty generator of the plurality of generators, wherein the at least one relay device comprises a processor that is configured to:
receive measurements of a plurality of parameters related to performance of one or more of the plurality of generators;
detect, based on the measurements, that values of at least two of the plurality of parameters measured for a first generator of the one or more generators do not match respective predetermined values of the at least two parameters for the first generator;
determine based at least on the detecting that the first generator is faulty; and
generate a signal to disconnect the first generator from at least one second generator of the plurality of generators, in response to determining that the first generator is faulty;
a power management sub-system for comparing values of each of the plurality of parameters measured for the first generator to respective values of the parameter measured for at least two other generators of the plurality of generators; and wherein the processor is further configured to:
detect that a value of at least one of the plurality of parameters measured for the first generator does not match a corresponding value of the at least one parameter measured for the at least two other generators; and
transmit a fault signal corresponding to the first generator to the relay device.

14. The system of claim 13, wherein the relay device is configured to generate the signal in response to determining that the first generator is faulty and additionally based on receiving the fault signal from the power management sub-system.

15. A system, comprising:
a plurality of generators for producing electrical power, wherein each of the plurality of generators is initially coupled to a bus; and
at least one relay device for detecting a faulty generator of the plurality of generators, wherein the at least one relay device comprises a processor that is configured to:
receive measurements of a plurality of parameters related to performance of one or more of the plurality of generators;
detect, based on the measurements, that values of at least two of the plurality of parameters measured for a first generator of the one or more generators do not match respective predetermined values of the at least two parameters for the first generator;
determine based at least on the detecting that the first generator is faulty; and
generate a signal to disconnect the first generator from at least one second generator of the plurality of generators, in response to determining that the first generator is faulty;
a prime mover to drive a rotor of the first generator; and
a speed governor to control a frequency of rotation of the rotor driven by the prime mover, wherein the speed governor generates a governor control signal to control the frequency of rotation driven by the prime mover;
wherein:
the at least two parameters comprise a real power generated by the first generator and the governor control signal; and
the processor is further configured to detect that the values of the at least two parameters measured for the first generator do not match respective predetermined values of the at least two parameters for the first generator comprises detecting that a measured value of the real power equals or exceeds a predetermined value of the real power for the first generator and the governor control signal is set to drive the frequency of rotation to equal or exceed a predetermined frequency of rotation for the first generator.

* * * * *